United States Patent
Suhara et al.

(10) Patent No.: US 6,744,545 B2
(45) Date of Patent: *Jun. 1, 2004

(54) OPTICAL SCANNING LENS, OPTICAL SCANNING DEVICE AND IMAGE FORMING APPARATUS

(75) Inventors: Hiroyuki Suhara, Kanagawa (JP); Satoru Itoh, Kanagawa (JP); Tatsuya Ito, Tokyo (JP); Takeshi Ueda, Tokyo (JP); Yoshinori Hayashi, Kanagawa (JP); Magane Aoki, Kanagawa (JP); Kenichi Takanashi, Chiba (JP); Takao Yamaguchi, Kanagawa (JP); Taira Kouchiwa, Kanagawa (JP); Koji Hirakura, Kanagawa (JP); Seizo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 10/143,013

(22) Filed: May 13, 2002

(65) Prior Publication Data

US 2002/0163571 A1 Nov. 7, 2002

Related U.S. Application Data

(62) Division of application No. 09/588,342, filed on Jun. 6, 2000, now Pat. No. 6,400,391.

(30) Foreign Application Priority Data

Jun. 9, 1999 (JP) .......................................... 11-163037

(51) Int. Cl.[7] .............................................. G02B 26/08
(52) U.S. Cl. ........................ 359/205; 359/212; 347/259
(58) Field of Search ........................ 359/205, 652–655, 359/206, 662; 347/241, 244, 258, 259

(56) References Cited

U.S. PATENT DOCUMENTS

| | | | |
|---|---|---|---|
| 5,557,448 A | 9/1996 | Endo et al. |
| 5,570,224 A | 10/1996 | Endo et al. |
| 5,581,392 A | 12/1996 | Hayashi |
| 5,652,670 A | 7/1997 | Hayashi |
| 5,757,532 A | 5/1998 | Takanashi |
| 5,771,115 A | 6/1998 | Takanashi |
| 5,786,594 A | 7/1998 | Ito et al. |
| 5,805,199 A | 9/1998 | Aoki |
| 5,834,766 A | 11/1998 | Suhara |
| 5,841,586 A | 11/1998 | Nagaoka |
| 5,875,051 A | 2/1999 | Suzuki et al. |
| 5,940,200 A | 8/1999 | Iizuka |
| 5,970,034 A | 10/1999 | Sakuma et al. |
| 5,986,791 A | 11/1999 | Suzuki et al. |
| 6,069,724 A | 5/2000 | Hayashi et al. |
| 6,081,386 A | 6/2000 | Hayashi et al. |
| 6,104,522 A | 8/2000 | Hayashi et al. |
| 6,185,026 B1 | 2/2001 | Hayashi et al. |
| 6,188,086 B1 | 2/2001 | Masuda et al. |

(List continued on next page.)

FOREIGN PATENT DOCUMENTS

JP  11-044641  2/1999

*Primary Examiner*—James Phan
(74) *Attorney, Agent, or Firm*—Oblon, Spivak, McClelland, Maier & Neustadt, P.C.

(57) ABSTRACT

An optical scanning lens is used in a scanning and image forming optical system which gathers a light flux deflected by a light deflector in the vicinity of a surface to be scanned. The lens is formed by plastic molding of polyolefin resin, and the following condition is satisfied: $0 < |\Delta n(x) - \min[\Delta n(x)]| < 34 \times 10^{-5}$, where $\Delta n(x)$ denotes a refractive-index distribution existing inside the lens, in a range which the light flux passes through, in the lens, and $\min[\Delta n(x)]$ denotes the minimum value of the $\Delta n(x)$.

55 Claims, 7 Drawing Sheets

U.S. PATENT DOCUMENTS

| | | |
|---|---|---|
| 6,198,562 B1 | 3/2001 | Hayashi et al. |
| 6,222,662 B1 | 4/2001 | Suzuki et al. |
| 6,229,638 B1 | 5/2001 | Sakai et al. |
| 6,233,081 B1 | 5/2001 | Suzuki et al. |
| 6,239,860 B1 | 5/2001 | Ito |
| 6,256,133 B1 | 7/2001 | Suzuki et al. |
| 6,317,246 B1 | 11/2001 | Hayashi et al. |
| 6,347,004 B1 | 2/2002 | Suzuki et al. |
| 6,359,717 B2 | 3/2002 | Suzuki et al. |
| 6,369,927 B2 | 4/2002 | Hayashi |
| 6,376,837 B1 | 4/2002 | Itabashi et al. |
| 6,381,057 B1 | 4/2002 | Itabashi |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,400,917 B2 | 6/2002 | Nakazato et al. |
| 6,417,509 B1 | 7/2002 | Atsuumi et al. |
| 6,429,956 B2 | 8/2002 | Itabashi |
| 6,445,482 B1 | 9/2002 | Hayashi |
| 6,448,998 B1 | 9/2002 | Suzuki et al. |
| 6,462,853 B2 | 10/2002 | Hayashi |
| 6,469,772 B1 | 10/2002 | Itabashi |
| 6,498,617 B1 | 12/2002 | Ishida et al. |
| 6,532,094 B2 * | 3/2003 | Suhara ....................... 359/205 |

* cited by examiner

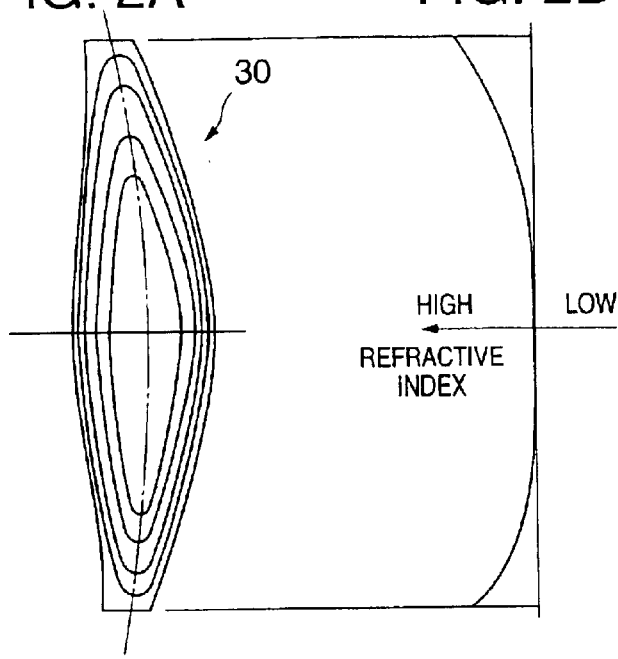
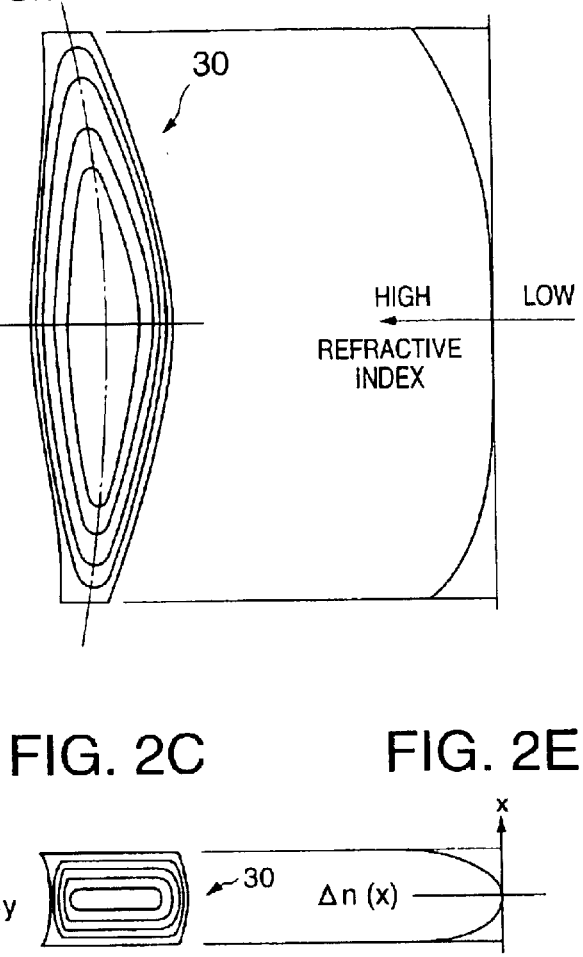
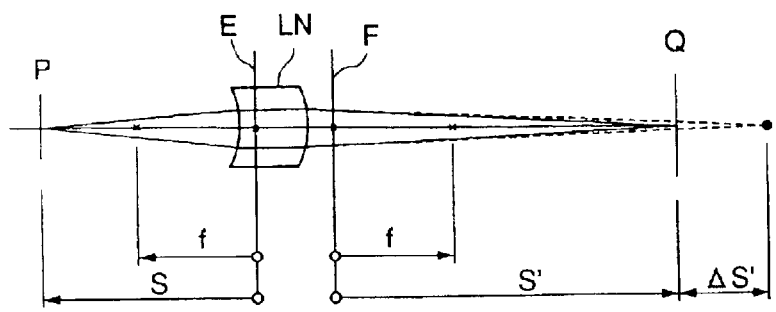

SHORT-LENGTH-DIRECTION POSITION [×mm]

FIG. 12

| RESIN<br>CHARACTERISTICS | PMMA | ALICYCLIC ACRYLIC RESIN | PC | ORDINARY POLYOLEFIN | ALICYCLIC POLYOLEFIN |
|---|---|---|---|---|---|
| REFRACTIVE INDEX | 1.49 | 1.50 | 1.58 | 1.47 | 1.51–1.54 |
| ABBE'S NUMBER | 58 | 56–57 | 31 | 61 | 54–57 |
| TRANSMITTANCE (%) | 94 | 93–94 | 92 | 90 | 91–92 |
| PHOTOELASTICITY CONSTANT ($\times 10^{-13}$ cm$^2$/dyne) | -6 | -0.8 – -0.3 | 90 | — | 4–8 |
| SATURATION MOISTURE ABSORPTION (%) | 2.0 | 1.0 | 0.4 | 0.1 | 0.1–0.5 |
| REFRACTIVE-INDEX DISTRIBUTION | ○ | ○ | ○ | — | × |
| MOLD SHRINKAGE COEFFICIENT (%) | 0.3–0.5 | 0.3–0.5 | 0.4–0.6 | 1.5–3 | 0.7–0.9 |

OPTICAL SCANNING LENS, OPTICAL SCANNING DEVICE AND IMAGE FORMING APPARATUS

This application is a division of U.S. patent application Ser. No. 09/588,342, filed Jun. 6, 2000, now U.S. Pat. No. 6,400,391.

BACKGROUND OF THE INVENTION

1. Field of the Invention

The present invention generally relates to an optical scanning lens, an optical scanning device and an image forming apparatus.

2. Description of the Related Art

An optical scanning device, which deflects a light flux from a light source at a uniform angular velocity by a light deflector having a deflection reflecting surface, converges the deflected light flux on a surface to be scanned as a beam spot by a scanning and image forming optical system, and, thus, scans the surface to be scanned at a uniform velocity with the beam spot, is well-known in relation to 'image forming apparatus' such as a digital copier, an optical printer, a laser plotter, a digital plate maker and so forth.

FIG. 1 illustrates one example of an optical scanning device.

A divergent light flux emitted by a semiconductor laser 10 is transformed into a light flux form (such as a parallel light flux or the like) suitable for subsequent optical systems by a coupling lens 12, passes through an opening of an aperture 14 so as to undergo 'beam formation', and is reflected by a mirror 18, while being converged in sub-scanning directions by a cylinder lens 16, and an approximately line-like image long in main-scanning directions is formed in the vicinity of a deflection reflecting surface of a rotational polygonal mirror 20. The light flux reflected by the deflection reflecting surface is incident on a scanning and image forming optical system 30 while being deflected at a uniform angular velocity as the rotational polygonal mirror 20 rotates at a uniform velocity, and is gathered in the vicinity of a surface to be scanned (actually, a photosensitive surface of a photoconductive photosensitive body or the like) 40 by a function of the optical system 30, and, thereby, a beam spot is formed on the surface to be scanned 40. By the beam spot, the surface to be scanned 40 is scanned in main scanning directions. The photosensitive surface which embodies the surface to be scanned 40 is moved in a sub-scanning direction (direction perpendicular to the plane of FIG. 1), and, the above-mentioned optical scanning is repeated. Thereby, a latent image is written on the photosensitive surface. A velocity of the above-mentioned optical scanning by a beam spot is made uniform by a function of a velocity uniformizing character of the scanning and image forming optical system 30.

Throughout the specification and claims, 'an optical scanning lens' is used in the above-described scanning and image forming optical system. In the example FIG. 1, the scanning and image forming optical system 30 consists of a single lens. In this case, the scanning and image forming optical system 30 itself is an optical scanning lens. When a scanning and image forming optical system consists of a plurality of optical elements (a plurality of single lenses, a lens and a concave mirror or the like), one or a plurality of single lenses used therein is an optical scanning lens.

As an optical scanning lens used in a scanning and image forming optical system, a lens obtained as a result of molding of plastic material has been used.

One problem occurring when an optical scanning lens is formed by molding plastic material is that a refractive-index distribution develops inside the thus-formed optical scanning lens.

In plastic molding, a plastic material, melted by heat, is molded by a metal die, and is cooled in the metal die. In this process, cooling of the material is fast in the periphery in comparison to the middle of the metal die. Thereby, a non-uniform distribution (the density of a fast-cooled portion is higher than the density of a slowly-cooled portion) in density and/or modification develops in the plastic. Thereby, the refractive index of the thus-formed lens is not uniform, and, thus, a refractive-index distribution develops therein.

FIGS. 2A through 2E illustrate such a refractive-index distribution. FIG. 2A shows a refractive-index distribution of an optical scanning lens 30 as a scanning and image forming optical system shown in FIG. 1 by contour lines in a section taken along a plane including the optical axis thereof and parallel to main scanning directions, and FIG. 2B shows a refractive-index distribution of that shown in FIG. 2A in directions perpendicular to the optical axis and parallel to the main scanning directions. FIG. 2C shows a refractive-index distribution of the optical scanning lens 30 by contour lines in a section taken along a plane including the optical axis thereof and parallel to sub-scanning directions, FIG. 2D shows a refractive-index distribution of that shown in FIG. 2C in directions parallel to the optical axis (axial directions), and FIG. 2E shows a refractive-index distribution of that shown in FIG. 2C in directions perpendicular to the optical axis and parallel to the sub-scanning directions.

As shown in FIGS. 2B, 2D and 2E, a refractive-index distribution in a plastic-molded lens is such that, generally, a refractive index at a peripheral portion of the lens is higher than that at a middle portion thereof.

Generally, when an optical scanning lens has such a refractive-index distribution inside thereof, actual optical characteristics thereof differ somewhat from 'design optical characteristics of the optical scanning lens designed assuming that a refractive index therein is uniform'.

For example, when an optical scanning lens has a positive power, on average, a refractive index of a peripheral portion of the lens is higher than a refractive index of a middle portion thereof, and, such a refractive-index distribution functions to shift an actual position at which a beam spot to be formed on a surface to be scanned is formed 'in direction in which the position goes away from a light deflector from a position determined in accordance with a design'.

A diameter of a beam spot by which an effective scanning range of a surface to be scanned is scanned changes as an image height changes depending on a curvature of field of an optical scanning lens. However, when a lens has such a refractive-index distribution therein, a diameter of a beam spot changes also due to an influence of the refractive-index distribution.

In FIG. 4, a vertical axis indicates a diameter of a beam spot and a horizontal axis indicates an amount of defocus (a difference between a position at which an image of a beam spot is formed (at which a light flux is gathered) and a position of a surface to be scanned). The vertical axis coincides with a surface of a photosensitive body as the surface to be scanned.

When an optical scanning lens has no refractive-index distribution therein and 'a refractive index of the lens is uniform throughout the lens', a relationship between an amount of defocus and a diameter of a beam spot is such that, as indicated by a broken line, the diameter of the beam spot is minimum at a position of a surface to be scanned (a position at which the amount of defocus is zero, actually, a position of a photosensitive body). However, when a refractive-index distribution exists, a relationship between an amount of defocus and a diameter of a beam spot is such that, as indicated by a solid line, the diameter of the beam spot at a position of a surface to be scanned is larger than that in accordance with a design (a cross point of the vertical axis and the broken line) due to 'beam thickening'

As materials of optical plastic lenses, mainly, acrylic resin, PC (polycarbonate) and polyolefin resin are known. Acrylic resin includes PMMA and alicyclic acrylic resin. Polyolefin resin includes ordinary polyolefin (such as polyethylene, polypropylene or the like) and alicyclic polyolefin.

FIG. 12 shows a list of optical characteristics of these resins.

A photoelasticity constant in the list of FIG. 12 can be used to determine whether double refraction of a lens formed by plastic molding is large or small. Acrylic resin is problematic because a moisture absorption is large although double refraction (photoelasticity constant) is small, and, in particular, a surface accuracy is likely to deteriorate as environment changes. Although PC (polycarbonate) has a high refractive index and a small moisture absorption, a photoelasticity constant thereof is very large and thereby double refraction is likely to develop, and wavefront aberration of a light flux transmitted thereby is likely to deteriorate.

Polyolefin resin has a small moisture absorption and a superior double refraction character. Therefore, recently, it is intended that polyolefin resin is used as a material of an optical scanning lens.

However, polyolefin resin has a relatively large mold shrinkage coefficient in comparison to other plastic materials, molding is somewhat difficult, and a refractive-index distribution is likely to develop unless molding conditions such as molding pressure, molding temperature and so forth are made to be the optimum ones.

SUMMARY OF THE INVENTION

An object of the present invention is to provide an optical scanning lens, a refractive index distribution of which is reduced to a level in which no problem occurs in optical characteristics, and to provide an optical scanning device using the optical scanning lens and an image forming apparatus using the optical scanning device.

An optical scanning lens according to the present invention is 'an optical scanning lens used in a scanning and image forming optical system which gathers a light flux deflected by a light deflector in the vicinity of a surface to be scanned'.

As described above, 'a scanning and image forming optical system' is an optical system which gathers a light flux deflected by a light deflector in the vicinity of a surface to be scanned, and, may consist of a single lens, may consist of a plurality of single lenses, or may consist of a combination of one or a plurality of single lens(es) and a specular surface (concave surface or convex surface) having a function of forming an image.

'An optical scanning lens' is a lens used as a component of a scanning and image forming optical system, and one or a plurality of single lens(es) thereof is (are) arranged in the scanning and image forming optical system. When a scanning and image forming optical system consists of a single lens, the optical scanning lens itself is the scanning and image forming optical system.

An optical scanning lens is formed by 'plastic molding of polyolefin resin'.

According to the present invention, the following condition is satisfied $$0<|\Delta n(x)-\min[\Delta n(x)]|<34\times10^{-5} \qquad (A)$$

where $\Delta n(x)$ denotes a refractive-index distribution existing inside the lens, in a range which the light flux passes through, in the lens, and $\min[\Delta n(x)]$ denotes the minimum value of the $\Delta n(x)$.

The above-mentioned 'range which the light flux passes through, in the lens' is a range which a light flux deflected by a light deflector passes through the optical scanning lens when being deflected.

According to another aspect of the present invention, the following condition is satisfied $$0<|\Delta n|<8.5\times10^{-5} \qquad (B)$$

where, when $\Delta n(x)$ denotes a refractive-index distribution existing inside the lens, in a range between approximately ±1 mm from a center of the light flux, in a range which the light flux passes through, in the lens, $\Delta n$ denotes a coefficient of second order in 'second-order least-square approximation' of the $\Delta n(x)$.

According to another aspect of the present invention, the following condition is satisfied $$0<|\Delta n(x)-\min[\Delta n(x)]|<34\times10^{-5} \qquad (A)$$

where $\Delta n(x)$ denotes a refractive-index distribution existing inside the lens, in a range which the light flux passes through, in the lens, and $\min[\Delta n(x)]$ denotes the minimum value of the $\Delta n(x)$, and, also, the following condition is satisfied $$0<|\Delta n|<8.5\times10^{-5} \qquad (B)$$

where, when $\Delta n(x)$ denotes a refractive-index distribution existing inside the lens, in a range between approximately ±1 mm from a center of the light flux, in a range which the light flux passes through, in the lens, $\Delta n$ denotes a coefficient of second order in second-order least-square approximation of the $\Delta n(x)$.

According to another aspect of the present invention, the following condition is satisfied $$0.4\times10^{-5}<|\Delta n(x)-\min[\Delta n(x)]|<16\times10^{-5} \qquad (C)$$

where $\Delta n(x)$ denotes a refractive-index distribution existing inside the lens, in a range which the light flux passes through, in the lens, and $\min[\Delta n(x)]$ denotes the minimum value of the $\Delta n(x)$.

According to another aspect of the present invention, the following condition is satisfied $$0.1\times10^{-5}<|\Delta n|<4.0\times10^{-5} \qquad (D)$$

where, when $\Delta n(x)$ denotes a refractive-index distribution existing inside the lens, in a range between approximately ±1 mm from a center of the light flux, in a range which the light flux passes through, in the lens, $\Delta n$ denotes a coefficient of second order in second-order least-square approximation of the $\Delta n(x)$.

According to another aspect of the present invention, the following condition is satisfied $$0.4\times10^{-5} < |\Delta n(x) - \min[\Delta n(x)]| < 16\times10^{-5} \quad (C)$$

where $\Delta n(x)$ denotes a refractive-index distribution existing inside the lens, in a range which the light flux passes through, in the lens, and $\min[\Delta n(x)]$ denotes the minimum value of the $\Delta n(x)$, and, also, the following condition is satisfied $$0.1\times10^{-5} < |\Delta n| < 4.0\times10^{-5} \quad (D)$$

where, when $\Delta n(x)$ denotes a refractive-index distribution existing inside the lens, in a range between approximately ±1 mm from a center of the light flux, in a range which the light flux passes through, in the lens, $\Delta n$ denotes a coefficient of second order in second-order least-square approximation of the $\Delta n(x)$.

In each aspect of the present invention, when the scanning and image forming optical system includes a plurality of single lenses, it is possible that the scanning and image forming optical system may include a lens(es) made of PC and/or acrylic resin, a glass lens(es) and/or the like, as a lens(es) other than the optical scanning lens of the plurality of single lenses.

An optical scanning device according to the present invention is 'an optical scanning device which deflects a light flux from a light source, gathers the deflected light flux on a surface to be scanned as a beam spot by a scanning and image forming optical system, and performs optical scanning of the surface to be scanned'.

As 'a light source', various types of well-known ones can be used. In particular, a semiconductor laser is preferable to be used as a light source.

An optical scanning device according to the present invention is characterized in that any optical scanning lens according to the present invention is mounted as an optical scanning lens used in a scanning and image forming optical system.

It is possible that, in any optical scanning device, a light deflector which deflects a light flux from the light source is provided and the light deflector 'has a deflection reflecting surface and deflects the light flux at a uniform angular velocity', and the optical scanning lens 'has a function of causing the scanning of the surface to be scanned to be performed at a uniform velocity'.

As the above-mentioned 'light deflector', it is preferable to use a rotational polygonal (multi-surface) mirror, a rotational dihedral (bi-surface) mirror, or a rotational mono-surface mirror.

It is possible that, in the optical scanning device, an image is formed from the light flux from the light source in the vicinity of the deflection reflecting surface of the light deflector, the image being like approximately a line long in main scanning directions. For example, it is possible that a light flux from the light source is transformed into a light-flux form (any form of a parallel light flux, a convergent light flux and a divergent light flux is possible) suitable for a subsequent optical system by a coupling lens, and, from the thus-coupled light flux, a line image long in main scanning directions is formed in the vicinity of the deflection reflecting surface of the light deflector by a line-image forming optical system such as a cylinder lens. Thereby, it is possible to correct a surface inclination of the light deflector.

An image forming apparatus according to the present invention is 'an image forming apparatus which performs optical scanning of a photosensitive surface of an image carrying body and thereby forms a latent image thereon, develops the latent image and thereby visualizes it'.

In an image forming apparatus according to the present invention, any optical scanning device according to the present invention is mounted as an optical scanning device which performs the optical scanning the photosensitive surface of the image carrying body as the surface to be scanned.

As 'an image carrying body', for example, a silver film for an original plate can be used. In this case, a printed image can be obtained as a result of development and fixing of a silver-film photographic process being performed on a formed latent image. An image forming apparatus in this case is 'a digital plate making machine'.

It is possible that, the image forming apparatus is 'an image forming apparatus in which the image carrying body is a photoconductive photosensitive body, after the photosensitive body being charged uniformly, an electrostatic latent image being formed thereon by the optical scanning, the thus-formed electrostatic latent image being developed so that a toner image is obtained, and the thus-obtained toner image being transferred and fixed onto a sheet-like recording medium'. Thereby, a printed image is obtained. In this case, the image forming apparatus is 'a digital copier, an optical printer, a laser plotter, a facsimile apparatus or the like'. As the above-mentioned sheet-like recording medium, transfer paper, a plastic sheet for an overhead projector, or the like can be used. A transfer of a toner image onto a sheet-like recording medium may be a transfer of a toner image from a photosensitive body to a recording medium directly, or may be a transfer via an intermediate transfer medium such as an intermediate transfer belt.

According to the present invention, it is possible to achieve novel optical scanning lens, optical scanning device and image forming apparatus.

An optical scanning lens according to the present invention is made of polyolefin resin which is superior in a moisture-absorption property and a double-refraction property, and has an internal refractive-index distribution controlled effectively, thereby being not likely to be affected by changes in environmental conditions such as temperature, humidity and so forth.

Further, an optical scanning device according to the present invention uses the above-mentioned optical scanning lens, and, thereby, it is possible to achieve an optical scanning device which is not likely to be affected by environmental fluctuation and is always satisfactory.

Furthermore, an image forming apparatus according to the present invention uses the above-mentioned optical scanning device, and, thereby, it is possible to achieve an image forming apparatus which is not likely to be affected by environmental fluctuation and is always satisfactory.

Other objects and further features of the present invention will become more apparent from the following detailed description when read in conjunction with the accompanying drawings.

BRIEF DESCRIPTION OF THE DRAWINGS

FIGS. 2A through 2E illustrate a refractive-index distribution inside an optical scanning lens;

FIG. 3 illustrates a change in an image-forming function due to a refractive-index distribution inside an optical scanning lens;

FIG. 12 shows optical characteristics of various resins.

DETAILED DESCRIPTION OF THE PREFERRED EMBODIMENTS

First, a refractive-index distribution will now be described supplementarily.

A refractive-index distribution $\Delta n(x)$ is defined as one obtained as a result of values of 'a two dimensional absolute refractive index' in a 'x-y section' parallel to an optical axis and to sub-scanning directions of an optical scanning lens (30) shown in FIG. 2C being averaged in y-axis directions, and being expressed as a one dimensional relative refractive index with respect to x-axis directions (see FIG. 2E).

'A range, which a light flux passes through, of a lens', is, 'a range, which a light flux deflected by a light deflector passes through when being deflected, of an optical scanning lens'. In details, with respect to main scanning directions, 'a range, which a light flux passes through and which corresponds to an effective writing width of a surface to be scanned, of a lens', is a range, which a deflected light flux passes through, in the lens, with respect to sub-scanning directions, it is preferable that 'a range, which a light flux passes through, of a lens', is 'one the order of between ±2 mm in consideration of change in an angle at which a light flux emitted from a light source and/or surface inclination of a light deflector'.

As shown in FIG. 2C, it is assumed that a direction parallel to an optical axis is a y direction and a direction parallel to sub-scanning directions is a x direction, and, although not shown in FIGS. 2A through 2E, it is assumed that a direction parallel to main scanning directions is a z direction.

An absolute refractive index n in a plane, which is perpendicular to the z direction at an arbitrary position in the main scanning directions, is expressed by $n(x, y)$. An average of absolute refractive indexes $n(x, y)$ in the y direction parallel to the optical axis is calculated by $$[\int n(x, y)dy]/d(x)$$

where $d(x)$ denotes a thickness of the lens in the optical-axis directions with respect to the x direction. The integration is performed through the thickness of the lens $d(x)$.

'An appropriate reference value' is set for the result of the above-mentioned calculation, and a difference between this set value and the result of the calculation is calculated. Thereby, the above-mentioned 'refractive-index distribution $\Delta n(x)$ obtained as a result of values of a two dimensional absolute refractive index in a x-y section parallel to the optical axis and to the sub-scanning directions of the optical scanning lens being averaged in the y-axis directions, and being expressed as a one dimensional relative refractive index with respect to the x-axis directions' is obtained. FIG. 2E shows the thus-obtained $\Delta n(x)$.

$\Delta n(x)$ in the following conditional expression (C) is the thus-obtained $\Delta n(x)$:

$$0.4 \times 10^{-5} < |\Delta n(x) - \min[\Delta n(x)]| < 16 \times 10^{-5}$$

'A method of obtaining a refractive-index distribution $\Delta n(x)$' for an actual optical scanning lens will now be described.

Figure 5:
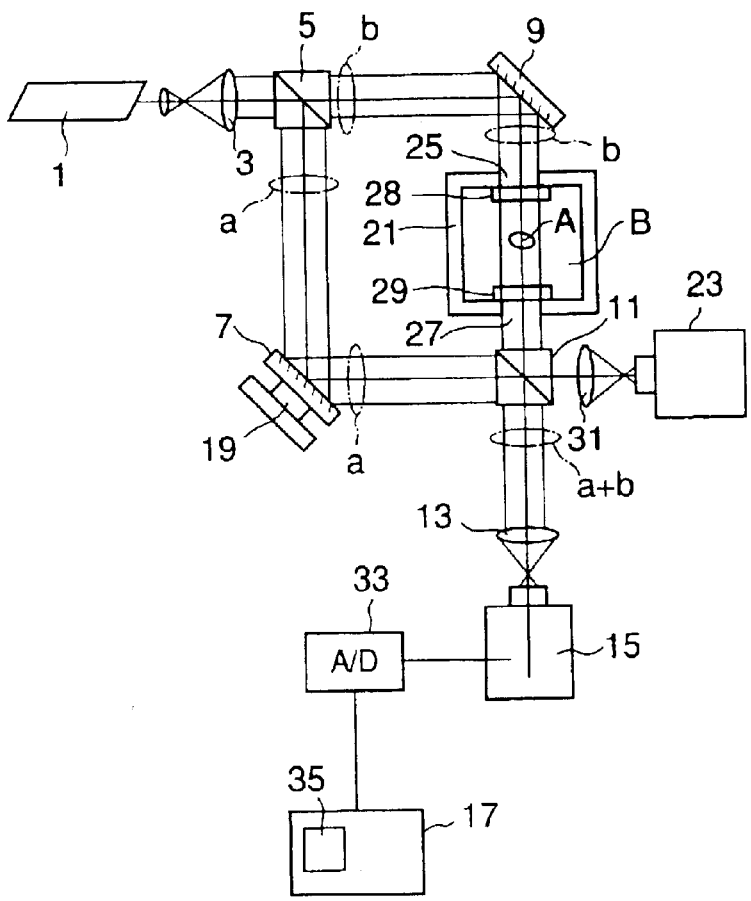
FIG. 5 illustrates a method of measuring a refractive-index distribution inside an optical scanning lens.
Figure 6:
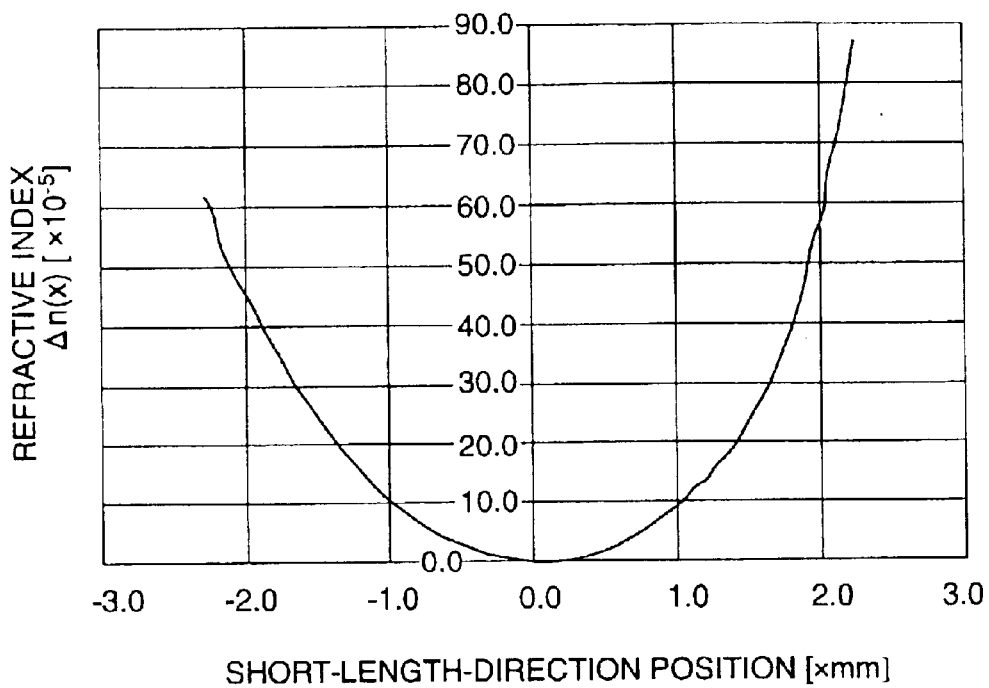
FIG. 6 shows a refractive-index distribution in a sample S1 for an optical scanning lens.

FIG. 5 illustrates an apparatus of measuring a refractive-index distribution using a Mach-Zehnder interferometer as a basic arrangement thereof.

A laser light flux which is coherence light is emitted by a laser light source 1, is transformed into a parallel light flux as a result of a diameter thereof being enlarged by a beam expander 3, and is incident on a beam splitter 5. The beam splitter 5 splits the incident laser light flux into two light fluxes. Specifically, the incident laser light flux is split by the beam splitter 5 into one laser light flux which is obtained as a result of being bent at a right angle by the beam splitter 5 and is of a reference wave 'a', and another laser light flux which is obtained as a result of being transmitted straightly by the beam splitter 5, being reflected by a reflective mirror 9 and being transmitted by a phase object as an object to be examined A and is of a wave to be examined 'b'. The beam splitter 5 splits the incident light flux in a manner such that a ratio of intensities of the reference wave 'a' and wave to be examined 'b' be approximately '1:1'.

A reflective mirror 7 is supported by an electricity-movement converting device 19 formed of a piezoelectric device or the like, and is arranged in a manner such that a length of light path of the reference wave 'a' can be changed in the order of wave length for a purpose of performing analysis of interference fringes in accordance with a phase shifting method.

The reference wave 'a' is reflected by the reflective mirror 7 and reaches a beam splitter 11. The wave to be examined 'b' is reflected by the reflective mirror 9, is transmitted by the object to be examined A, and reaches the beam splitter 11. The beam splitter 11 joins the reference wave 'a' and wave to be examined 'b' together into a joined light flux, and splits the joined light flux into two light fluxes. The electricity-movement converting device 19 is adjusted so that 'a phase difference of $m\pi/2$' be obtained in length of light path between the reference wave 'a' and wave to be examined 'b' to be joined together, where 'm' is an integer. One split light flux of the joined light flux split by the beam splitter 11 is incident on an image forming lens 13, and, thereby, an image of interference fringes (of the reference wave 'a' and wave to be examined 'b') is formed on an image pickup surface of an interference-fringe detector 15. As the interference-fringe detector 15, a linear CCD, or an array-like sensor is used. The other split light flux of the joined light flux split by the beam splitter 11 is incident on an image pickup surface of a CCD camera for monitoring 23, and, thereby, an image of the interference fringes is formed thereon, through an image forming lens 31.

A refractive index of the object to be examined A is considerably different from that of the air, and, unless an incident side and an emitting side of the object to be examined A are parallel to one another, the wave to be examined 'b' transmitted by the object to be examined A converges/diverges irregularly depending on a shape of the object to be examined A. In order to cause an image of interference fringes to be formed on the image pickup surface of the interference-fringe detector 15, the wave to be examined 'b' should be 'an approximately parallel light flux'. The following arrangement is made in order to cause the wave to be examined 'b' having been transmitted by the object to be examined A to be an approximately parallel light flux regardless of a shape of the object to be examined A.

That is, the object to be examined A is set inside a cell 21 provided on a light path of the wave to be examined 'b', and the cell 21 is filled with a test liquid B 'made up so that a refractive index thereof is approximately equal to a refractive index of the object to be examined A'. Two ends of the cell 21, that is an incident window 25 and an emitting window 27 for the wave to be examined 'b' are parallel to one another, and optical flats 28 and 29 each having high surface accuracy are attached thereto, and the cell 21 is sealed for preventing the liquid inside from leaking.

The cell 21 filled with the object to be examined A and test liquid B is an object, a refractive index of which is uniform through the entirety thereof, and an incident surface and an emitting surface of which are parallel to one another. Accordingly, the wave to be examined 'b' transmitted by the cell 21 is emitted therefrom as being an approximately parallel light flux. When a refractive-index distribution inside the object to be examined A is non-uniform, a wave surface of the wave to be examined 'b' emitted from the cell 21 has 'a curved-surface shape depending on the refractive-index distribution'. Interference fringes, an image of which is formed on the image pickup surface of the interference-fringe detector 15, develop due to interference between the wave to be examined 'b' of the above-mentioned curved-surface shape and the reference wave 'a' which is a plane wave. The curved-surface shape of the wave to be examined 'b' can be measured by well-known analysis of interference fringes.

An image of interference fringes is detected by the interference-fringe detector 15, undergoes photoelectric conversion so as to become an electric image signal, is converted into a digital signal by an A-D converter 33, and is input to a calculation device 17.

The calculation device 17 includes a transmitted wave surface measuring unit 35 which measures and calculates a transmitted wave surface (a shape of wave surface of the wave to be examined 'b') by analysis of interference fringes. Specifically, the calculation device 17 is a personal computer or the like which 'has a CPU and performs various calculation processes in accordance with programs stored in a hard disk drive or the like'.

A refractive-index distribution of an optical scanning lens as the object to be examined A is measured as follows.

The optical scanning lens as the object to be measured A is set in the cell 21, coherent light from the laser light source 1 is incident on the optical scanning lens, and, as described above, an image of interference fringes is formed on the interference-fringe detector 15. An image signal of the image of interference fringes output by the interference-fringe detector 15 is input to the calculation device 17, the transmitted wave surface measuring unit 35 in the calculating device 17 performs 'analysis of interference fringes', and, thus, a transmitted wave surface WF(x) is measured. The apparatus shown in FIG. 5 is arranged so that a direction of a linear CCD of the interference-fringe detector 15 corresponds to the x direction (sub-scanning directions) described above with respect to the optical scanning lens.

A thickness d(x) in optical-axis directions of the optical scanning lens as the object to be examined A is obtained previously from design data of the optical scanning lens or measured data thereof by a general-purpose measuring apparatus.

As mentioned above, based on an output of the linear CCD of the inference-fringe detector 15, the transmitted wave surface WF(x) is measured by the transmitted wave surface measuring unit 35. Then, an arbitrary position on the linear CCD is determined to be a position of 'x=0' and a reference transmitted wave surface WF(0) is obtained, and, then, $\Delta n(x)$ is calculated by the following equation:

$$\Delta n(x) = \{WF(x) - WF(0)\} \cdot \lambda / d(x)$$

Thus, a refractive-index distribution $\Delta n(x)$ can be calculated for an arbitrary measurement section. A refractive-index distribution in main scanning directions is such that variation is small in comparison to that in sub-scanning directions. Therefore, by measuring for several specific sections (of middle portion, peripheral portion and so forth), it is possible to grasp a refractive-index distribution of the entirety of an optical scanning lens. It is possible to use a refractive-index distribution measured for one section of a middle portion or the like as a representative one of an overall refractive-index distribution, for those such as mass-produced ones for which mold conditions are stable. A change of a measurement section can be performed by changing a position relationship between the linear CCD and a lens to be examined to be that such that the lens to be examined is moved in z directions relative to the linear CCD.

This measuring method is disclosed by Japanese Laid-Open Patent Application No. 11-044641, the entire contents of which are hereby incorporated by reference.

In the above-described method, $\Delta n(x)$ is calculated from 'an optical-axis directional thickness directionally added-up transmitted wave surface'. Accordingly, although 'a refractive-index distribution in optical-axis directions' such as that shown in FIG. 2D cannot be obtained, average data $\Delta n(x)$ obtained as a result of it being added up in optical-axis directions is sufficient to grasp optical characteristics of an optical scanning lens. Further, because $\Delta n(x)$ is of one-dimension, this can be easily managed as an evaluation item advantageously.

$\Delta n(x)$ in the above equation is a function of only 'x'. However, it is possible to perform two-dimensional measurement.

$\Delta n(x)$ calculated as mentioned above can be expanded by a polynominal approximation as follows:

$$\Delta n(x) \approx n0 + n1 \cdot x + n2 \cdot x^2 + n3 \cdot x^3 \quad (1)$$

(The symbol '≈' signifies 'is approximately equal to'.)

Then, by obtaining respective coefficients n0, n1, n2, ..., nm (coefficient of a term of a highest m-th order), it is possible to obtain a refractive-index distribution at a position of a coordinate 'x' on an x-axis axis directly. Although the number of order of the above-mentioned polynominal is arbitrary, the second order is selected, for example, and the following equation is used.

$$\Delta n(x) = n_0 + n1 \cdot x + \Delta n \cdot x^2 + \delta(x) \quad (2)$$

In the right side of this equation, 'a coefficient of second order $\Delta n$' affects optical characteristics largely. Because a coefficient of first order no has a small optical influence, it is possible to neglect the coefficient. $\delta(x)$ is a residual due to second-order approximation and is a slight amount. Accordingly, the following expression can be obtained.

$$\Delta n(x) \approx n_0 + \Delta n \cdot x^2 \quad (3)$$

In the above expression (3), $\Delta n$ is determined by a least squares method.

In the above expression (3), the coefficient of second order $\Delta n$ functions as 'a lens power'. Because a diameter of a light flux passing through an optical scanning lens is on the order of 1 mm in general, a range of 'x', when $\Delta n$ is calculated is determined to be one between ±1 mm, here.

Influence which is exerted on a lens function by the coefficient of second order $\Delta n$ will now be described making reference to FIG. 3. In FIG. 3, points E and F are front and rear principal points of a lens LN, respectively, a point Q is an image point of an object point P. A length f is a design focal length of the lens LN. Lengths S and S' are a design object distance and a design image distance, respectively.

As described above, a refractive-index distribution can be regarded as 'functioning as a lens'. Therefore, when considering 'a lens equivalent to a refractive-index distribution', it is possible to express a relationship between a focal length f' of the equivalent lens, $\Delta n$, and a lens thickness t, by the following expression.

$$f' \approx 1/(2 \cdot \Delta n \cdot t) \quad (4)$$

(When an optical scanning lens is a compound lens consisting of a plurality of single lenses, a lens thickness t in the above expression (4) is 'the sum in thickness of respective single lenses of the optical scanning lens'.)

A focal length of a lens having a refractive-index distribution is a focal length of a compound system of a lens having a design focal length f and an equivalent lens having a focal length f', and a change in focal length $\Delta f$ can be expressed by approximation as follows.

$$\Delta f \approx f^2/f' \quad (5)$$

A shift in position of image formation $\Delta S'$ due to a refractive-index distribution can be expressed using the following thin lens's paraxial image-formation formula:

$$(1/S' = 1/S + 1/f)$$

as follows.

$$\Delta S' \approx \{S/(S+f)\}^2 \cdot \Delta f \quad (6)$$
$$= \{f \cdot S/(S+f)\}^2 / f'$$
$$= (S')^2 \cdot (2 \cdot \Delta n \cdot t)$$

Figure 1:
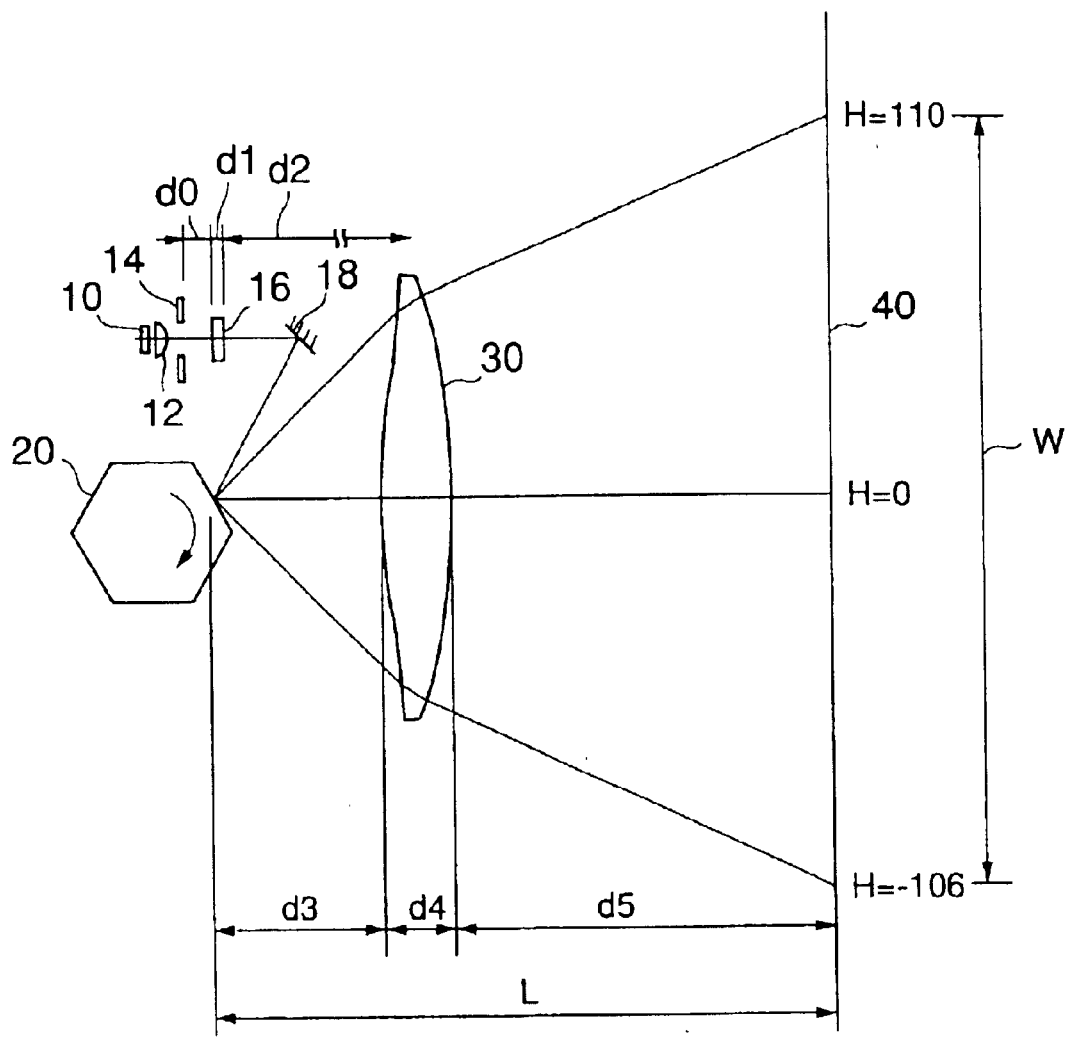
FIG. 1 illustrates one embodiment of an optical scanning device according to the present invention.
Figure 4:
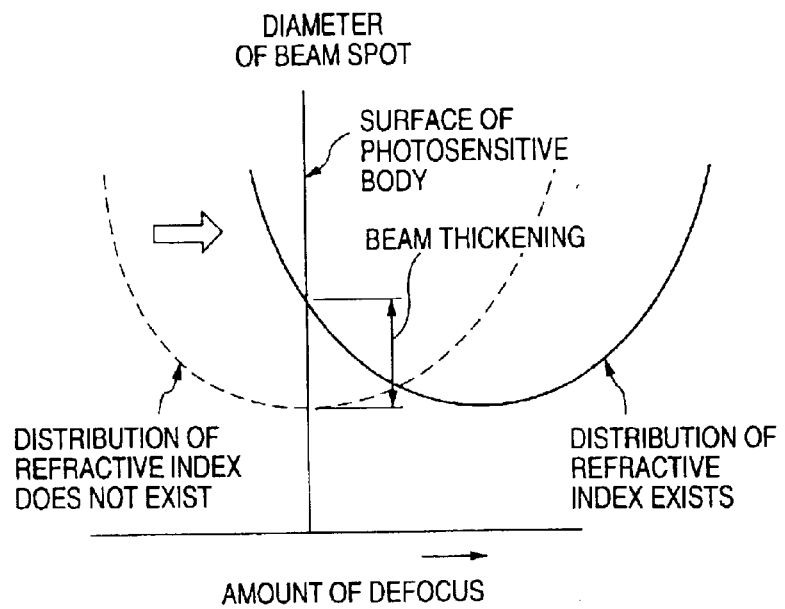
FIG. 4 illustrates an increase in a beam-spot diameter (beam thickening) due to defocus.

When L denotes a distance between a deflection reflecting surface of a light deflector and a surface to be scanned as shown in FIG. 1 and $\beta$ denotes a lateral magnification of an optical scanning lens 30, the above expression (6) can be expressed by approximation as follows.

$$\Delta S' \approx \{\beta/(\beta-1) \cdot L\}^2 \cdot (2 \cdot \Delta n \cdot t) \quad (7)$$

By using the above expression (7), an amount of defocus $\Delta S'$ can be obtained from the above-mentioned '$\Delta n$' of an optical scanning lens by calculation.

When 'an allowance of focal depth' is defined as an allowance of defocus in the range between ±10% from a beam-spot diameter (a diameter at which a beam intensity is $1/e^2$ of a peak value), a theoretical allowance of focal depth w is obtained by the following expression (8) using a beam-spot diameter d and a wavelength $\lambda$.

$$w \approx 1.487 \times d^2/\lambda \quad (8)$$

When it is possible to control a shift in position of image formation $\Delta S'$ in the range of this allowance of focal depth w, it is possible to obtain a stable beam-spot diameter on a surface to be scanned. That is, an optical scanning lens should be made as a lens which satisfies the following condition.

$$w \geq \Delta S' \quad (9)$$

By using the above-expression (9), it is possible to determine 'a magnitude of $\Delta n$' so that a beam-spot diameter can be controlled in an allowable range. Because a refractive-index distribution is determined depending on a degree of a magnitude of $\Delta n$, it is possible to achieve a satisfactory beam-spot diameter by controlling a refractive-index distribution $\Delta n(x)$ within a predetermined range.

An embodiment of the present invention will now be described regarding an optical scanning device shown in FIG. 1 as the embodiment of the present invention. An optical scanning lens 30 is 'made to be most suitable to conditions in which the optical scanning device is used' in accordance with a design.

In the optical scanning device shown in FIG. 1, assuming that a target beam-spot diameter d is such that d=70 ($\mu$m) and a wavelength $\lambda$ of a semiconductor laser (as a light source) is such that $\lambda$=400 (nm), an allowance of focal depth w is such that w=18.2 (mm) by the expression (8). When the optical scanning lens 30 is used under conditions such that a length of optical path L is such that L=200 (mm), a lateral magnification $\beta$ is such that $\beta$=−1.0, a lens thickness t is such that t=10 (mm), and a beam effective diameter is ±2 mm, it can be determined that $\Delta n$ should be equal to or less than $9.1 \times 10^{-5}$, as a result of calculating backward from the allowance by the expression (9).

As another case, assuming that a target beam-spot diameter d is such that d=90 ($\mu$m) and a wavelength $\lambda$ of a semiconductor laser is such that $\lambda$=650 (nm), an allowance of focal depth w is such that w=18.5 (mm) by the expression (8). When the optical scanning lens 30 is used under conditions such that a length of optical path L is such that L=200 (mm), a lateral magnification $\beta$ is such that $\beta$=−0.5, a lens thickness t is such that t=20 (mm), and a beam effective diameter is ±2 mm, it can be determined that $\Delta n$ should be equal to or less than $10.4 \times 10^{-5}$ so that the allowance is satisfied.

A shape of the lens 30 (a radius of curvature, a thickness and a refractive index) and a mounting accuracy actually deviate from design values due to a manufacturing process and so forth. It is preferable that an allowance of 'a shift in lens shape' be within the range of 10 to 20% of a value corresponding to an allowance of focal depth.

Accordingly, a coefficient of second order $\Delta n$ of a refractive-index distribution should satisfy the following condition.

$$0 < |\Delta n| < 8.5 \times 10^{-5} \quad (B)$$

When a refractive-index distribution $\Delta n(x)$ denotes non-uniformity of refractive index existing inside the lens in the range between ±2 mm in sub-scanning directions and min$[\Delta n(x)]$ denotes the minimum value thereof, it can be determined that these should satisfy $$0 < |\Delta n(x) - \min[\Delta n(x)]| < 34 \times 10^{-5} \quad (A)$$

as a result of values such that $\Delta n = 8.5 \times 10^{-5}$ and x=2 being substituted for $\Delta n$ and x in the following expression $$\Delta n(x) \approx n_0 + \Delta n \cdot x^2 \quad (3)$$

so that 'a shift in lens shape' be within an allowance. When $|\Delta n(x) - \min[\Delta n(x)]| \geq 34 \times 10^{-5}$, optical characteristics deteriorate regardless of shape and size of a lens.

In view of practical use, it is preferable that the following conditions are satisfied.

$$0.1 \times 10^{-5} < |\Delta n| < 4.0 \times 10^{-5} \quad (D)$$

$$0.4 \times 10^{-5} < |\Delta n(x) - \min[\Delta n(x)]| < 16 \times 10^{-5} \quad (C)$$

When $|\Delta n|$ exceeds the upper limit $4.0 \times 10^{-5}$ and increases, it is necessary to limit a wavelength λ to be used and/or decreases an optical magnification $|\beta|$, and restrictions on an optical design become strict. On the other hand, when $|\Delta n|$ exceeds the lower limit $0.1 \times 10^{-5}$ and decreases, not only a measurement error cannot be ignored, but also a cooling time required for molding increases, manufacturing efficiency deteriorates, and cost increases.

As a result of a refractive-index distribution inside an optical scanning lens being able to be measured non-destructively by such a method as that described above, it is possible to determine whether or not optical characteristics of an optical scanning lens made of polyolefin resin is satisfactory without actually performing measurement of the optical characteristics.

In the embodiment shown in FIG. 1, a length of light path L between a light deflector 20 and a surface to be scanned 40 is determined such that L=200 (mm), an optical scanning lens 30 is designed to be an optimum one under conditions such that a lens thickness t thereof is such that t=10 (mm) and a lateral magnification β thereof is such that β=−1.0.

Samples S1 through S5 were made by plastic molding using polyolefin resin (ordinary polyolefin) in five different mold conditions for the above-mentioned optical scanning lens.

Figure 7:
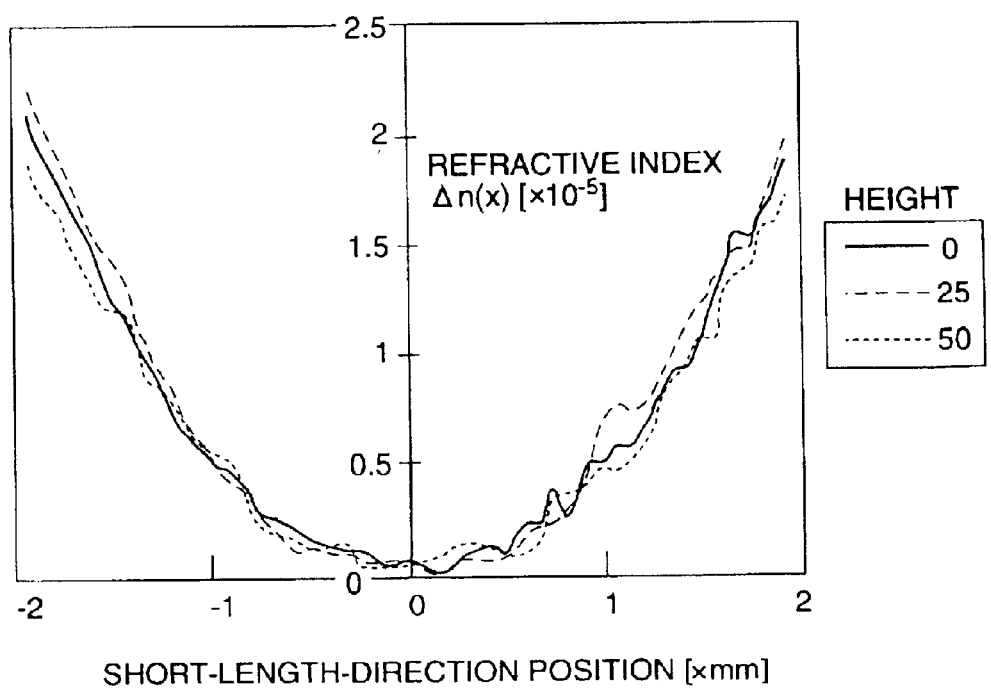
FIG. 7 shows a refractive-index distribution in a sample S2 for an optical scanning lens.
Figure 8:
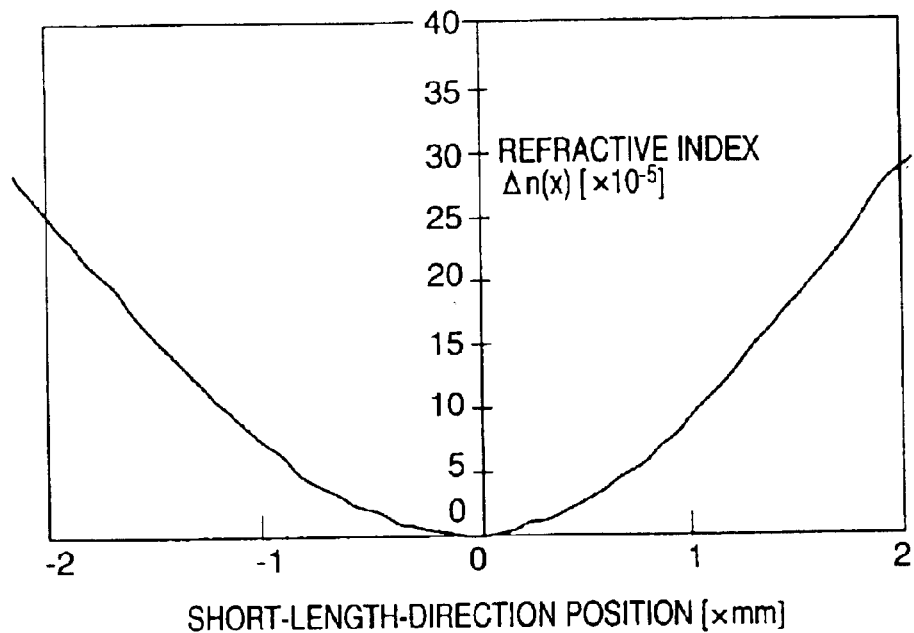
FIG. 8 shows a refractive-index distribution in a sample S3 for an optical scanning lens.
Figure 9:
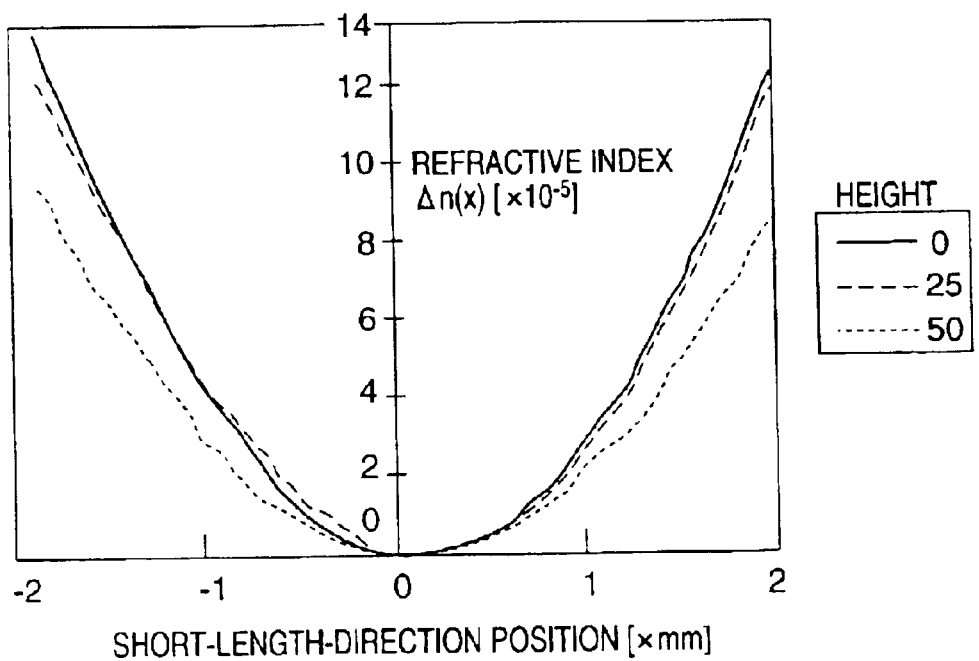
FIG. 9 shows a refractive-index distribution in a sample S4 for an optical scanning lens.
Figure 10:
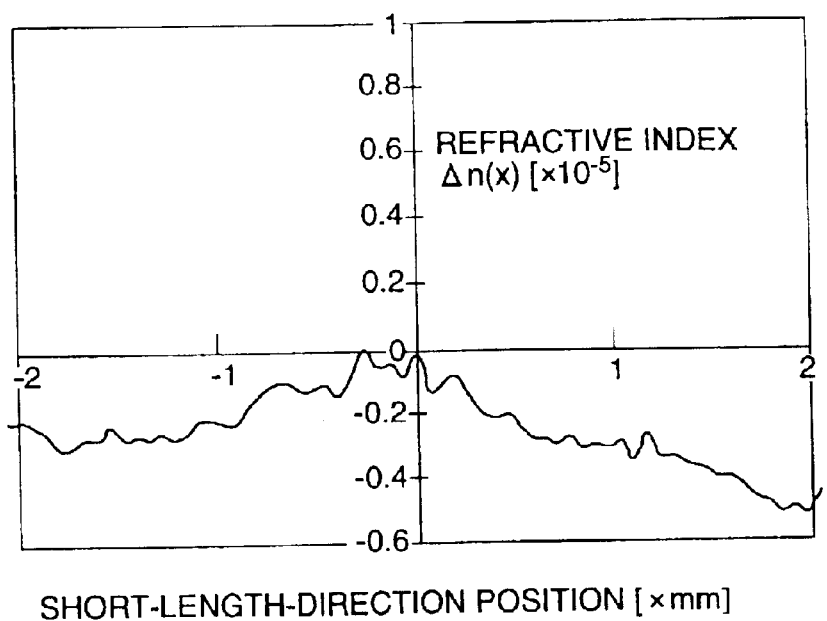
FIG. 10 shows a refractive-index distribution in a sample S5 for an optical scanning lens.

Results of measurements of refractive-index distributions Δn(x) for these samples are shown in FIGS. 6 through 10. In each of FIGS. 6 through 10, a refractive-index distribution Δn(x) of a vertical axis is indicated assuming that a reference value of Δn(x) is 0, 'short-length direction' indicated for a horizontal axis is sub-scanning directions, and, is the above-mentioned x direction, and the range between ±2 mm of upper and lower limits of the horizontal axis is 'a range in the sub-scanning directions which a light flux passes through'. FIGS. 7 and 9 show three types of refractive-index distributions Δn(x) for different 'lens heights', respectively. A 'height' in the figures indicates a position of plane in main scanning directions, in which plane measurement of Δn(x) is made, assuming that the optical-axis position is 0. That is, in FIGS. 7 and 9, the three types of refractive-index distributions Δn(x) are refractive-index distributions in respective positions in the main scanning directions such that z=0, 25, and 50 (mm) assuming that the optical-axis position is such that z=0.

The above-mentioned '$|\Delta n(x) - \min[\Delta n(x)]|$' and a coefficient of second order Δn in a quadratic expression obtained as a result of Δn(x) being expanded in the range between ±1 mm, within a range in the lens which a light flux passes through (within the range between ±50 mm in the main scanning directions and ±2 mm in the sub-scanning directions), of the samples S1 through S5, are as follows:

For a sample S1, $$|\Delta n(x) - \min[\Delta n(x)]| \leq 53.9 \times 10^{-5},$$

$$\Delta n = 10.3 \times 10^{-5} [1/mm^2]$$

For a sample S2, $$|\Delta n(x) - \min[\Delta n(x)]| \leq 2.1 \times 10^{-5},$$

$$\Delta n = 0.5 \times 10^{-5} [1/mm^2]$$

For a sample S3, $$|\Delta n(x) - \min[\Delta n(x)]| \leq 29.7 \times 10^{-5},$$

$$\Delta n = 8.3 \times 10^{-5} [1/mm^2]$$

For a sample S4, $$|\Delta n(x) - \min[\Delta n(x)]| \leq 13.8 \times 10^{-5},$$

$$\Delta n = 3.8 \times 10^{-5} [1/mm^2]$$

For a sample S5, $$|\Delta n(x) - \min[\Delta n(x)]| \leq 0.47 \times 10^{-5},$$

$$\Delta n = -0.2 \times 10^{-5} [1/mm^2]$$

As described above, the optical scanning lens 30 is designed to an optimum one in the conditions such that the length of light path L=200 (mm), the lateral magnification β=−1.0, and the lens thickness t=10 (mm). An amount of defocus developing due to a refractive-index distribution inside the lens is obtained by the expression (4) as follows: 20.6 mm for the sample S1, 1.0 mm for the sample S2, 16.6 mm for the sample S3, 7.6 mm for the sample S4 and −0.4 mm for the sample S5. When these are compared with the above-described allowance of focal depth w (w=18.2 (mm) when a target beam-spot diameter d=70 (μm) and a wave length of the semiconductor laser λ=400 (nm); w=18.5 (mm) when a target beam-spot diameter d=90 (μm) and a wave length of the semiconductor laser λ=650 (nm)), for the sample S1, because the amount of defocus is larger than the allowance of focal depth, the sample S1 is rejected as an optical scanning lens. However, for each of the samples S2 through S5, because the amount of defocus is controlled within the allowance of focal depth, these samples can be used as optical scanning lenses. It is noted that results of actually measuring allowances of focal depth by measuring beam diameters were similar to the above calculation results, and, thereby, correctness of the calculation results was proved.

When comparison is made only for the refractive-index distributions Δn(x), the sample S5 is most satisfactory. However, manufacturing costs of the respective samples differ from each other due to differences in mold temperature, holding pressure, mold time and so forth. Accordingly, which one is the best should be determined as a result of these factors being considered synthetically.

Practical preferable examples of a scanning optical system and calculation results of allowances of focal depth w and coefficients Δn therefor are shown below.

① An optical system using an inexpensive laser having a long wavelength:

w=15.4 (mm) and Δn=3.8×10$^{-5}$ in a case where d=90 (μm), λ=780 (nm), L=175 (mm), β=−2.3, and t=13.5 (mm).

Accordingly, the samples S2, S4 and S5 can be used as optical scanning lenses.

② An optical system in which a target beam diameter is small:

w=6.9 (mm) and Δn=1.4×10$^{-5}$ in a case where d=55 (μm), λ=650 (nm), L=226 (mm), β=−1.1, and t=18 (mm).

Accordingly, the samples S2 and S5 can be used as optical scanning lenses.

③ An optical system in which a scanning width is wide and it is necessary that a distance L between a deflection reflecting surface and a photosensitive body is long:

w=9.6 (mm) and Δn=0.45×10$^{-5}$ in a case where d=65 (μm), λ=655 (nm), L=307 (mm), β=−1.5, and t=31.4 (mm).

Accordingly, the sample S5 can be used as an optical scanning lens.

④ An optical system in which a target beam diameter is very small, also a scanning width is wide and it is necessary that a distance L between a deflection reflecting surface and a photosensitive body is long:

w=2.1 (mm) and Δn=0.11×10⁻⁵ in a case where d=30 (µf), λ=650 (nm), L=300 (mm), β=−1.1, and t=39 (mm).

Accordingly, no sample can be used as an optical scanning lens. In this case, it is necessary to form a plastic-molded lens having a refractive-index distribution smaller than that of the sample S5. When a certain degree of restriction conditions should thus be satisfied in an optical design, it is preferable that the following conditions are satisfied.

$$0.1\times10^{-5}<|\Delta n|<4.0\times10^{-5} \quad (D)$$

$$0.4\times10^{-5}<|\Delta n(x)-\min[\Delta n(x)]|<16\times10^{-5} \quad (C)$$

However, these conditions (C) and (D) are not limited for the above-mentioned optical systems ① through ④.

The above-mentioned expressions (A), (B), (C) and (D) are normalized for a lens thickness. Accordingly, these are applied for each single lens when an optical scanning lens is a compound lens consisting of a plurality of single lenses.

Figure 11:
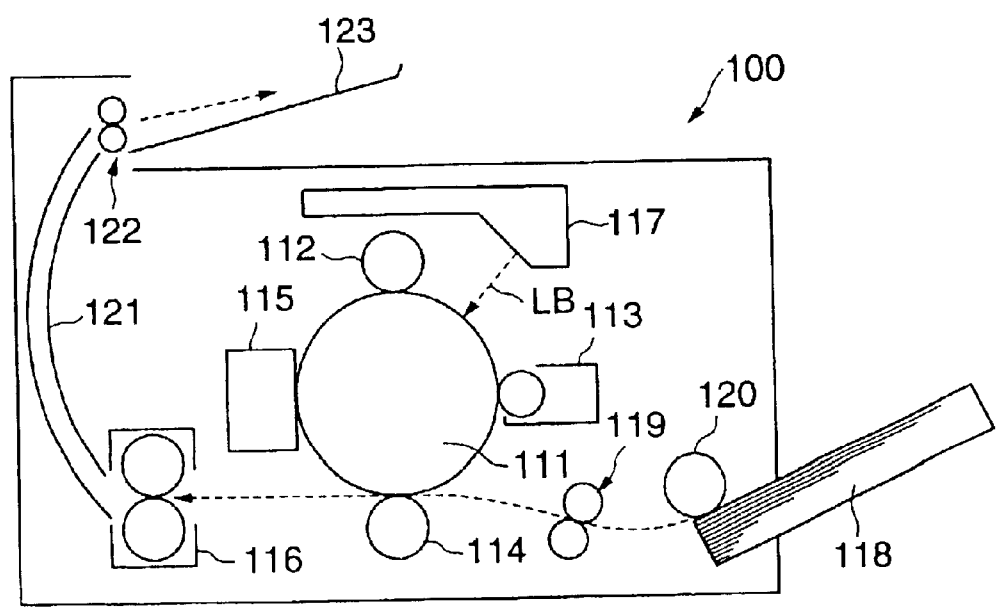
FIG. 11 illustrates one embodiment of an image forming apparatus according to the present invention.

An embodiment of an image forming apparatus according to the present invention will now be described. FIG. 11 roughly shows a laser printer in the embodiment of the image forming apparatus according to the present invention.

The laser printer 100 has a 'cylindrical photoconductive photosensitive body' as an image carrying body 111. Around the image carrying body 111, a charting roller 112 as a charting unit, a developing unit 113, a transfer roller 114 and a cleaning unit 115 are arranged. In this embodiment, the charging roller 112 of a contact-type charging roller which generates less ozone is used as a charting unit. However, it is also possible to use a corona charger utilizing corona discharging as a charting unit, instead. Further, an optical scanning device 117 is provided, which performs 'exposure by optical scanning by a laser beam LB' between the charging roller 112 and developing unit 113.

Further, as shown in FIG. 11, a fixing unit 116, a cassette 118, a pair of registration rollers 119, a paper feeding roller 120, a conveyance path 121, a pair of paper ejecting rollers 122, and a tray 123 are provided.

When a printed image is formed, the image carrying body 111 which is the photoconductive photosensitive body is rotated at a uniform velocity, a surface thereof is charged uniformly by the charging roller 112, and a electrostatic latent image is formed thereon by exposure by optical writing by a laser beam performed by the optical scanning device 117. The thus-formed electrostatic latent image is a so-called 'negative latent image' and in which an image portion is exposed.

The electrostatic latent image is developed by the developing unit 113 so that a toner image (positive image) is formed on the image carrying body 111. The cassette 118 containing transfer paper is detachable from a body of the laser printer 100, and, in a condition in which the cassette 118 is attached to the body as shown in the figure, a top sheet of the transfer paper contained thereby is fed by the paper feeding roller 120. The thus-fed transfer-paper sheet is taken by the pair of the registration rollers 119 at the front end thereof. The pair of registration rollers 119 feed the transfer-paper sheet to the transfer roller 114 at a time at which the toner image on the image carrying body 111 moves to the transfer roller 114. The thus-fed transfer-paper sheet is laid on the toner image at the transfer roller 114 and, by a function of the transfer roller 114, the toner image is electrostatically transferred onto the transfer-paper sheet. The transfer-paper sheet having the toner image transferred thereonto has the toner image fixed thereonto by the fixing unit 116, then, passes through the conveyance path 121, and is ejected onto the tray 123 by the pair of paper ejecting rollers 122.

After the toner image is transferred to the transfer-paper sheet, the surface of the image carrying body 111 is cleaned by the cleaning unit 115, and, thus, residual toner, paper powder and so forth are removed therefrom.

As 'the optical scanning device 117', that described above in accordance with FIG. 1 is used, and, as an optical scanning lens 30 thereof, that formed by plastic molding of polyolefin resin described above and satisfying the above-mentioned condition(s) (A) and/or (B), or condition(s) (C) and/or (D) is mounted.

Further, the present invention is not limited to the above-described embodiments, and variations and modifications may be made without departing from the scope of the present invention.

The present application is based on Japanese priority application No. 11-163037, filed on Jun. 9, 1999, the entire contents of which are hereby incorporated by reference.

What is claimed is:

1. An optical scanning lens which is used in a scanning and image forming optical system which gathers a light flux deflected by a light deflector in the vicinity of a surface to be scanned, wherein:
said lens is formed by a resin having the following properties:
photoelasticity constant $\leq 8$ ($10^{-13}$ cm²/dyne);
saturation moisture absorption=0.5 (%); and
mold shrinkage coefficient=0.7 (%), and
the following condition is satisfied:

$$0<|\Delta n(x)-\min[\Delta n(x)]|<34\times10^{-5} \quad (A)$$

wherein:
Δn(x) denotes a refractive-index distribution existing inside said lens, in a range which the light flux passes through, in said lens; and
min[Δn(x)] denotes the minimum value of said Δn(x).

2. An optical scanning device which deflects a light flux from a light source, gathers the deflected light flux on a surface to be scanned by a scanning and image forming optical system as a beam spot, and performs optical scanning of said surface to be scanned, wherein the optical scanning lens as claimed in claim 1 is mounted as an optical scanning lens used in said scanning and image forming optical system.

3. The optical scanning device as claimed in claim 2 comprising a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

4. The optical scanning device as claimed in claim 3 wherein an image is formed from the light flux from the light source in the vicinity of the deflection reflecting surface of said light deflector, said image being like approximately a line long in main scanning directions.

5. An image forming apparatus which performs optical scanning of a photosensitive surface of an image carrying body and thereby forms a latent image thereon, develops the latent image and thereby visualizes it, wherein the optical scanning device as claimed in claim 2 is mounted as an optical scanning device which performs the optical scanning of the photosensitive surface of said image carrying body as the surface to be scanned.

6. The image forming apparatus as claimed in claim 5, wherein said optical scanning device comprises a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

7. The image forming apparatus as claimed in claim 6 wherein, in said optical scanning device, an image is formed from the light flux from the light source in the vicinity of the deflection reflecting surface of said light deflector, said image being like approximately a line long in main scanning directions.

8. The image forming apparatus as claimed in claim 5, wherein said image carrying body is a photoconductive photosensitive body, after the photosensitive surface being charged uniformly, an electrostatic latent image being formed thereon by the optical scanning, the thus-formed electrostatic latent image being developed so that a toner image is obtained, and the thus-obtained toner image being transferred and fixed onto a sheet-like recording medium.

9. An optical scanning lens which is used in a scanning and image forming optical system which gathers a light flux deflected by a light deflector in the vicinity of a surface to be scanned, wherein:
said lens is formed by a resin having the following properties:
photoelasticity constant $\leq 8$ ($10^{-13}$ cm$^2$/dyne);
saturation moisture absorption=0.5 (%); and
mold shrinkage coefficient=0.7 (%), and
the following condition is satisfied:

$$0<|\Delta n|<8.5\times 10^{-5} \quad (A)$$

where, when $\Delta n(x)$ denotes a refractive-index distribution existing inside of said lens, in a range between approximately $\pm 1$ mm from a center of the light flux, in a range which the light flux passes through, in said lens, $\Delta n$ denotes a quadratic coefficient in quadratic least-square approximation of said $\Delta n(x)$.

10. The optical scanning lens as claimed in claim 9, wherein the following condition is satisfied $$0<|\Delta n|<8.5\times 10^{-5} \quad (B)$$

where, when $\Delta n(x)$ denotes a refractive-index distribution existing inside said lens, in a range between approximately $\pm 1$ mm from a center of the light flux, in a range which the light flux passes through, in said lens, $\Delta n$ denotes a coefficient of second order in second-order least-square approximation of said $\Delta n(x)$.

11. An optical scanning device which deflects a light flux from a light source, gathers the deflected light flux on a surface to be scanned by a scanning and image forming optical system as a beam spot, and performs optical scanning of said surface to be scanned, wherein the optical scanning lens as claimed in claim 10 is mounted as an optical scanning lens used in said scanning and image forming optical system.

12. The optical scanning device as claimed in claim 11 comprising a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

13. The optical scanning device as claimed in claim 12 wherein an image is formed from the light flux from the light source in the vicinity of the deflection reflecting surface of said light deflector, said image being like approximately a line long in main scanning directions.

14. An image forming apparatus which performs optical scanning of a photosensitive surface of an image carrying body and thereby forms a latent image thereon, develops the latent image and thereby visualizes it, wherein the optical scanning device as claimed in claim 11 is mounted as an optical scanning device which performs the optical scanning of the photosensitive surface of said image carrying body as the surface to be scanned.

15. The image forming apparatus as claimed in claim 14, wherein said optical scanning device comprises a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

16. The image forming apparatus as claimed in claim 15 wherein, in said optical scanning device, an image is formed from the light flux from the light source in the vicinity of the deflection reflecting surface of said light deflector, said image being like approximately a line long in main scanning directions.

17. The image forming apparatus as claimed in claim 14, wherein said image carrying body is a photoconductive photosensitive body, after the photosensitive surface being charged uniformly, an electrostatic latent image being formed thereon by the optical scanning, the thus-formed electrostatic latent image being developed so that a toner image is obtained, and the thus-obtained toner image being transferred and fixed onto a sheet-like recording medium.

18. An optical scanning device which deflects a light flux from a light source, gathers the deflected light flux on a surface to be scanned by a scanning and image forming optical system as a beam spot, and performs optical scanning of said surface to be scanned, wherein the optical scanning lens as claimed in claim 9 is mounted as an optical scanning lens used in said scanning and image forming optical system.

19. The optical scanning device as claimed in claim 18 comprising a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

20. The optical scanning device as claimed in claim 19 wherein an image is formed from the light flux from the light source in the vicinity of the deflection reflecting surface of said light deflector, said image being like approximately a line long in main scanning directions.

21. An image forming apparatus which performs optical scanning of a photosensitive surface of an image carrying body and thereby forms a latent image thereon, develops the latent image and thereby visualizes it, wherein the optical scanning device as claimed in claim 18 is mounted as an optical scanning device which performs the optical scanning of the photosensitive surface of said image carrying body as the surface to be scanned.

22. The image forming apparatus as claimed in claim 21, wherein said optical scanning device comprises a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

23. The image forming apparatus as claimed in claim 22 wherein, in said optical scanning device, an image is formed from the light flux from the light source in the vicinity of the deflection reflecting surface of said light deflector, said image being like approximately a line long in main scanning directions.

24. The image forming apparatus as claimed in claim 21, wherein said image carrying body is a photoconductive photosensitive body, after the photosensitive surface being charged uniformly, an electrostatic latent image being formed thereon by the optical scanning,
the thus-formed electrostatic latent image being developed so that a toner image is obtained, and
the thus-obtained toner image being transferred and fixed onto a sheet-like recording medium.

25. An optical scanning lens which is used in a scanning and image forming optical system which gathers a light flux deflected by a light deflector in the vicinity of a surface to be scanned, wherein:
said lens is formed by a resin having the following properties:
photoelasticity constant $\leq 8$ ($10^{-13}$ cm$^2$/dyne);
saturation moisture absorption=0.5 (%); and
mold shrinkage coefficient=0.7 (%), and
the following condition is satisfied:

$$0.4 \times 10^5 < |\Delta n(x) - \min[\Delta n(x)]| < 16 \times 10^{-5} \quad (A)$$

where:
$\Delta n(x)$ denotes a refractive-index distribution existing inside said lens, in a range which the light flux passes through, in said lens; and
$\min[\Delta n(x)]$ denotes the minimum value of said $\Delta n(x)$.

26. An optical scanning device which deflects a light flux from a light source, gathers the deflected light flux on a surface to be scanned by a scanning and image forming optical system as a beam spot, and performs optical scanning of said surface to be scanned, wherein the optical scanning lens as claimed in claim 25 is mounted as an optical scanning lens used in said scanning and image forming optical system.

27. The optical scanning device as claimed in claim 26 comprising a light deflector which deflects the light flux from the light source, wherein:
said light deflector has a deflection reflecting surface and deflects the light flux at a uniform angular velocity; and
said optical scanning lens has a function of causing the scanning of said surface to be scanned to be performed at a uniform velocity.

28. The optical scanning device as claimed in claim 27 wherein an image is formed from the light flux from the light source in the vicinity of the deflection reflecting surface of said light deflector, said image being like approximately a line long in main scanning directions.

29. An image forming apparatus which performs optical scanning of a photosensitive surface of an image carrying body and thereby forms a latent image thereon, develops the latent image and thereby visualizes it, wherein the optical scanning device as claimed in claim 26 is mounted as an optical scanning device which performs the optical scanning of the photosensitive surface of said image carrying body as the surface to be scanned.

30. The image forming apparatus as claimed in claim 29, wherein said optical scanning device comprises a light deflector which deflects the light flux from the source, wherein:
said light deflector has a deflection reflecting surface and deflects the light flux at a uniform angular velocity; and
said optical scanning lens has a function of causing the scanning of said surface to be scanned to be performed at a uniform velocity.

31. The image forming apparatus as claimed in claim 30 wherein, in said optical scanning device, an image is formed from the light flux from the light source in the vicinity of the deflection reflecting surface of said light deflector, said image being like approximately a line long in main scanning directions.

32. The image forming apparatus as claimed in claim 29, wherein said image carrying body is a photoconductive photosensitive body, after the photosensitive surface being charged uniformly, an electrostatic latent image being formed thereon by the optical scanning,
the thus-formed electrostatic latent image being developed so that a toner image is obtained, and
the thus-obtained toner image being transferred and fixed onto a sheet-like recording medium.

33. An optical scanning lens which is used in a scanning and image forming optical system which gathers a light flux deflected by a light deflector in the vicinity of a surface to be scanned, wherein:
said lens is formed by a resin having the following properties:
photoelasticity constant $\leqq 8$ ($10^{-13}$ cm$^2$/dyne);
saturation moisture absorption=0.5 (%); and
mold shrinkage coefficient=0.7 (%), and
the following condition is satisfied:

$$0.1 \times 10^{-5} < |\Delta n| < 4.0 \times 10^{-5} \quad (A)$$

where, when $\Delta n(x)$ denotes a refractive-index distribution existing inside of said lens, in a range between approximately ±1 mm from a center of the light flux, in a range which the light flux passes through, in said lens, $\Delta n$ denotes a quadratic coefficient in quadratic least-square approximation of said $\Delta n(x)$.

34. The optical scanning lens as claimed in claim 33, wherein the following condition is satisfied $$0.1 \times 10^{-5} < |\Delta n| < 4.0 \times 10^{-5} \quad (B)$$

where, when $\Delta n(x)$ denotes a refractive-index distribution existing inside said lens, in a range between approximately ±1 mm from a center of the light flux, in a range which the light flux passes through, in said lens, $\Delta n$ denotes a coefficient of second order in second-order least-square approximation of said $\Delta n(x)$.

35. An optical scanning device which deflects a light flux from a light source, gathers the deflected light flux on a surface to be scanned by a scanning and image forming optical system as a beam spot, and performs optical scanning of said surface to be scanned,
wherein the optical scanning lens as claimed in claim 34 is mounted as an optical scanning lens used in said scanning and image forming optical system.

36. The optical scanning device as claimed in claim 35 comprising a light deflector which deflects the light flux from the light source,
wherein:
said light deflector has a deflection reflecting surface and deflects the light flux at a uniform angular velocity; and
said optical scanning lens has a function of causing the scanning of said surface to be scanned to be performed at a uniform velocity.

37. The optical scanning device as claimed in claim 36 wherein an image is formed from the light flux from the light source in the vicinity of the deflection reflecting surface of said light deflector, said image being like approximately a line long in main scanning directions.

38. An image forming apparatus which performs optical scanning of a photosensitive surface of an image carrying body and thereby forms a latent image thereon, develops the latent image and thereby visualizes it,
wherein the optical scanning device as claimed in claim 35 is mounted as an optical scanning device which performs the optical scanning of the photosensitive surface of said image carrying body as the surface to be scanned.

39. The image forming apparatus as claimed in claim 38, wherein said optical scanning device comprises a light deflector which deflects the light flux from the light source,
wherein:
said light deflector has a deflection reflecting surface and deflects the light flux at a uniform angular velocity; and
said optical scanning lens has a function of causing the scanning of said surface to be scanned to be performed at a uniform velocity.

40. The image forming apparatus as claimed in claim 39 wherein, in said optical scanning device, an image is formed from the light flux from the light source in the vicinity of the deflection reflecting surface of said light deflector, said image being like approximately a line long in main scanning directions.

41. The image forming apparatus as claimed in claim 38, wherein said image carrying body is a photoconductive photosensitive body,
after the photosensitive surface being charged uniformly, an electrostatic latent image being formed thereon by the optical scanning,
the thus-formed electrostatic latent image being developed so that a toner image is obtained, and
the thus-obtained toner image being transferred and fixed onto a sheet-like recording medium.

42. An optical scanning device which deflects a light flux from a light source, gathers the deflected light flux on a surface to be scanned by a scanning and image forming optical system as a beam spot, and performs optical scanning of said surface to be scanned,
wherein the optical scanning lens as claimed in claim 33 is mounted as an optical scanning lens used in said scanning and image forming optical system.

43. The optical scanning device as claimed in claim 42 comprising a light deflector which deflects the light flux from the light source,
wherein:
said light deflector has a deflection reflecting surface and deflects the light flux at a uniform angular velocity; and
said optical scanning lens has a function of causing the scanning of said surface to be scanned to be performed at a uniform velocity.

44. The optical scanning device as claimed in claim 43 wherein an image is formed from the light flux from the light source in the vicinity of the deflection reflecting surface of said light deflector, said image being like approximately a line long in main scanning directions.

45. An image forming apparatus which performs optical scanning of a photosensitive surface of an image carrying body and thereby forms a latent image thereon, develops the latent image and thereby visualizes it,
wherein the optical scanning device as claimed in claim 42 is mounted as an optical scanning device which performs the optical scanning of the photosensitive surface of said image carrying body as the surface to be scanned.

46. The image forming apparatus as claimed in claim 45, wherein said optical scanning device comprises a light deflector which deflects the light flux from the light source,
wherein:
said light deflector has a deflection reflecting surface and deflects the light flux at a uniform angular velocity; and
said optical scanning lens has a function of causing the scanning of said surface to be scanned to be performed at a uniform velocity.

47. The image forming apparatus as claimed in claim 46 wherein, in said optical scanning device, an image is formed from the light flux from the light source in the vicinity of the deflection reflecting surface of said light deflector, said image being like approximately a line long in main scanning directions.

48. The image forming apparatus as claimed in claim 45, wherein said image carrying body is a photoconductive photosensitive body, after the photosensitive surface being charged uniformly, an electrostatic latent image being formed thereon by the optical scanning, the thus-formed electrostatic latent image being developed so that a toner image is obtained, and the thus-obtained toner image being transferred and fixed onto a sheet-like recording medium.

49. An optical scanning lens which is used in a scanning and image forming optical system which gathers a light flux deflected by a light deflector in the vicinity of a surface to be scanned, wherein:
said lens is formed by a resin having the following properties:
photoelasticity constant $\leq 8$ ($10^{-13}$ cm$^2$/dyne);
saturation moisture absorption=0.5 (%); and
mold shrinkage coefficient=0.7 (%), and
the following condition is satisfied:

$$1.487 \times d^2/\lambda \geq \{\beta/(\beta-1) \cdot L\}^2 \cdot (2 \cdot \Delta n \cdot t),$$

where:
d denotes a beam diameter defined by $1/e^2$ the peak intensity thereof,
$\lambda$ denotes a wavelength;
$\beta$ denotes a lateral magnification of said lens;
L denotes a distance between the deflection surface of the optical deflector and the surface to be scanned; and
$\Delta n$ denotes a quadratic coefficient of refractive-index distribution approximated from $\Delta n(x)$ by a least squares method in quadratic formula, where $\Delta n(x)$ denotes a refractive-index distribution existing in said lens in a range of approximately ±1 mm from the center of the light flux within a region which the light flux passes through, in said lens; and
t denotes a thickness of said lens.

50. The optical scanning lens as claimed in claim 49, wherein said lens is molded by using a metal die.

51. The optical scanning lens as claimed in claim 49, wherein said resin comprises a polyolefin resin.

52. An optical scanning device which deflects a light flux from a light source, gathers the deflected light flux on a surface to be scanned by a scanning and image forming optical system as a beam spot, wherein the optical scanning lens claimed in claim 49 is applied in said scanning and image forming optical system.

53. An image forming apparatus which performs optical scanning of a photosensitive surface of an image carrying body and thereby forms a latent image thereon, wherein the optical scanning device claimed in claim 52 is mounted as an optical scanning device which performs the optical scanning of the photosensitive surface of said image carrying body as the surface to be scanned.

54. An optical scanning lens which is used in a scanning and image forming optical system which gathers a light flux deflected by a light deflector in the vicinity of a surface to be scanned, wherein:
a difference between the maximum and the minimum of $\Delta n$ in respective lens heights along a main scanning direction within an effective diameter is equal to or less than $1 \times 10^{-5}$,
where $\Delta n$ denotes a quadratic coefficient of refractive-index distribution approximated from $\Delta n(x)$ by a least squares method in quadratic formulas, where $\Delta n(x)$ denotes a refractive-index distribution existing in said lens in a range of approximately ±1 mm from the center of the light flux within a region which the light flux passes through, in said lens.

55. An optical scanning lens which is used in a scanning and image forming optical system which gathers a light flux deflected by a light deflector in the vicinity of a surface to be scanned, wherein:
a refractive-index distribution existing inside of said lens within a range where the light flux passes through can be expressed approximately by a quadric curve; and
the following requirement is satisfied:

$$0 < |\Delta n(x) - \min[\Delta n(x)]| < 34 \times 10^{-5} \quad (A)$$

where:
$\Delta n(x)$ denotes a refractive index distribution inside of said lens within the range where the light flux passes through, in said lens; and
$\min[\Delta n(x)]$ denotes the minimum value of $\Delta n(x)$.

* * * * *